T. E. MURRAY.
METHOD OF MOLDING PIPES OF PLASTIC MATERIAL.
APPLICATION FILED JULY 7, 1921.
1,406,578. Patented Feb. 14, 1922.
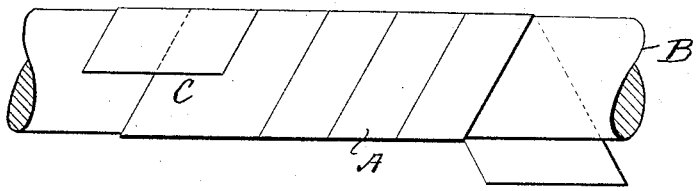
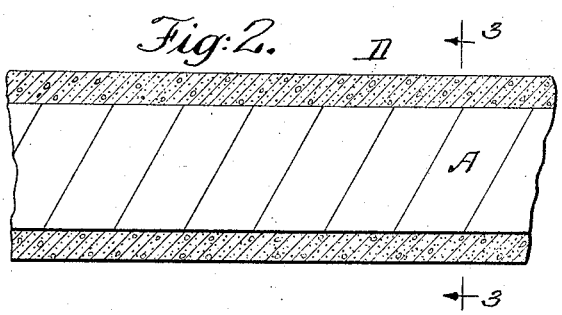 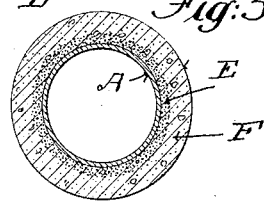
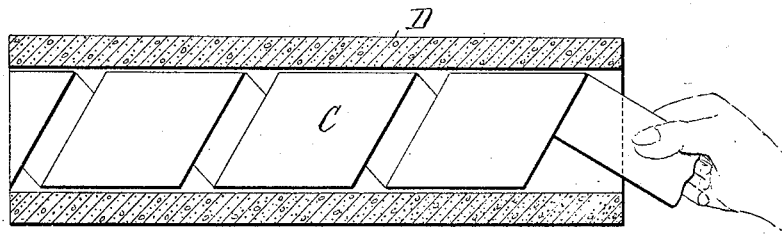
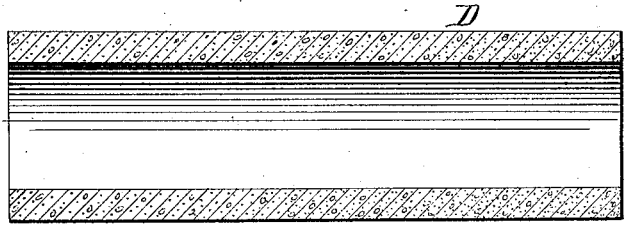
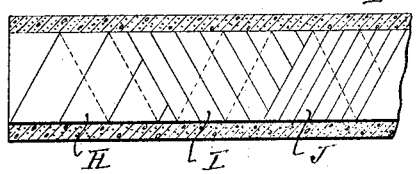 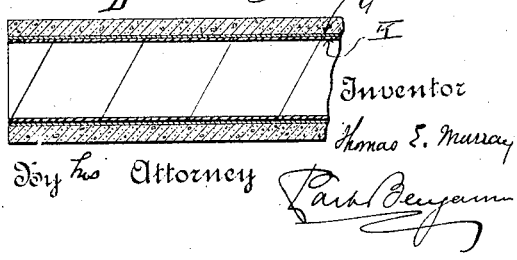

UNITED STATES PATENT OFFICE.

THOMAS E. MURRAY, OF BROOKLYN, NEW YORK.

METHOD OF MOLDING PIPES OF PLASTIC MATERIAL.

1,406,578.   Specification of Letters Patent.   Patented Feb. 14, 1922.

Application filed July 7, 1921. Serial No. 482,914.

*To all whom it may concern:*

Be it known that I, THOMAS E. MURRAY, a citizen of the United States, residing at Brooklyn, in the county of Kings and State of New York, have invented a certain new and useful Improvement in Methods of Molding Pipes of Plastic Material, of which the following is a specification.

The invention is a method of making pipes of cement or like plastic material by molding the same upon a cylindrical core of paper.

In the accompanying drawing—

Fig. 1 shows my core formed from a spiral strip of paper upon a suitable mandrel. Fig. 2 is a longitudinal and Fig. 3 is a cross section (on the line 3, 3 of Fig. 2) of said core with the pipe molded thereon. Fig. 4 illustrates the mode of removing the core after the cement has sufficiently set. Fig. 5 is a longitudinal section of the finished pipe. Fig. 6 is a sectional view similar to Fig. 2, the core here being made of a plurality of spirals wound one upon the other and in opposite directions. Fig. 7 is a sectional view, also similar to Fig. 2, in which the core is made of two spirals, the outer one being of bibulous and the inner one of non-bibulous paper.

Similar letters of reference indicate like parts.

The core upon which the pipe is molded is to be preferably of bibulous paper having overlapping edges united by a paste soluble in water. I preferably form said core A in spiral form by winding the same upon any suitable mandrel, as B, with its turns overlapping, as shown at C, and united by the paste, so that when removed from the mandrel it is a stiff tube. Upon this tube the cement D or other plastic material which is to form the pipe is directly molded, as shown in Fig. 2. When the core is thus enclosed in the plastic cement, it absorbs water therefrom which softens the fastening paste, so that the core may be unwound, as illustrated in Fig. 4, by the hand of the operator grasping one end of the spiral strip which may then easily be withdrawn from the molded pipe. This withdrawal may be done after all the applied cement has hardened; but I find that with suitably absorptive paper it may be accomplished usually after the cement mass has set for a sufficient distance—for example, as indicated at E, Fig. 3—inwardly from its inner surface to enable said set portion to support the still more or less plastic outer portion F, and so prevent deformation of the mass after the core has been removed. In either case, the core not only serves as a support whereon the cement is molded, but also by its absorption of the moisture first from the adjacent inner surface of the cement determines the initial hardening of that part of the molded mass.

Instead of making the core of a single strip of paper, I may make it in layers H, I, J of superposed spirally wound strips, which may have their turns in alternately opposite directions, as shown in Fig. 6, in which case, after the softening of the paste, said strips may be unwound and removed separately. Instead of making the whole core of moisture-absorbing material, I may make it of a plurality of spirals, of which the outermost spiral or sheath G, Fig. 7, is of bibulous paper and the inner spiral K or spirals of non-bibulous paper, the latter then serving to strengthen and support the structure. In this case, the sheath G will be removed after the paste has become softened, in the manner already described, after which the inner ones can easily be withdrawn from the pipe.

Attention is called to the fact that this core is made of nothing but flexible bibulous material—preferably, as I have said, paper—in tubular form, and is, therefore, free from any internal supports of wood or metal and is not held distended by air pressure or any other extraneous means. It is, therefore, very cheaply produced. The mode of its removal described—by manually unwinding after the paste is softened—ensures that its complete removal from the pipe without the aid of any special appliances for that purpose, and because of such complete removal there is nothing left in the pipe to become washed away by water traversing the pipe or torn therefrom by the drawing of electric conductors through it, and, therefore, all danger of fragments of paper being accumulated in bends, elbows, valves or other constricted portions of the conduit is avoided. The absorptive action of the bibulous paper upon the cement immediately in contact with it resulting in the quick setting of the cement, as before described, I believe new of itself, and is of importance in that it rapidly ensures a hard inner layer of cement immediately around the bore, which will support the rest of the mass even if it be quite soft;

so that it is not necessary to leave the core in place until the whole wall of the pipe has hardened before proceeding to make another section of the pipe in prolongation of the one already made.

I claim:

1. The method of making a molded cement pipe, which consists in molding plastic cement upon a core of flexible bibulous material formed with joints united by a paste, then allowing the paste to soften to cause the separation of said joints, and then manually withdrawing said core from said pipe.

2. The method of making a molded cement pipe, which consists in, first, producing a cylindrical core by winding a strip of bibulous paper spirally with overlapping turns and uniting said turns together with a paste soluble in water; second, molding upon said core the plastic cement to form the pipe and allowing said core to remain in said cement until the water absorbed by said paper from said cement has sufficiently softened said paste; and, third, manually unwinding and removing said core from the molded pipe.

In testimony whereof I have affixed my signature in presence of two witnesses.

THOMAS E. MURRAY.

Witnesses:
GERTRUDE T. PORTER,
MAY T. McGARRY.